United States Patent Office 3,631,038
Patented Dec. 28, 1971

3,631,038
PRODUCTION OF 6-ALKOXYPYRIDAZINIUM COMPOUNDS
Franz Reicheneder and Rudolf Kropp, Ludwigshafen, Germany, assignors to Badische Anilin- & Soda-Fabrik Aktiengesellschaft, Ludwigshafen (Rhine), Germany
No Drawing. Filed Mar. 11, 1970, Ser. No. 18,690
Claims priority, application Germany, Mar. 14, 1969, P 19 12 941.0
Int. Cl. C07d 51/04
U.S. Cl. 260—247.5 R           5 Claims

ABSTRACT OF THE DISCLOSURE

Production of 6-alkoxypyridazinium compounds by reaction of pyridazone-(6) with alkylating agents, and new substances of this type. The new compounds are pharmaceuticals and starting materials for the production of dyes, pharmaceuticals and pesticides.

---

The invention relates to a process for the production of 6-alkoxypyridazinium compounds by reaction of pyridazones-(6) with alkylating agents and to new substances of this type.

It is known that 2-methyl-2,3-H-pyridazino-(4,5,6-m,1)-fluorene-3-thiones and 2-phenyl-2,3-H-pyridazino-(4,5,6-m,1)-fluorene-3-thiones can be converted with dimethyl sulfate in toluene into the corresponding quaternary salts (Chemistry of Heterocyclic Compounds, 2, 319 et seq. (1967)). An article in Acta Chem. Scand., 21, 1067 to 1080 (1967) describes the quaternization of pyridazines with methyl iodide to form pyridazinium compounds.

An object of this invention is a new process for producing 6-alkoxypyridazinium compounds in a simple and economical way and in good yields and high purity.

Another object of this invention is new 6-alkoxypyridazinium compounds.

These and other objects are achieved and 6-alkoxypyridazinium compounds having the general formula:

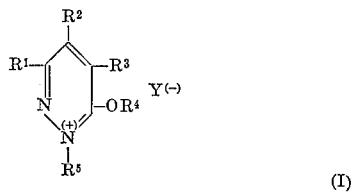

(I)

where:

$R^1$ denotes a hydrogen atom, a halogen atom, a hydroxyl group, an alkoxy group, an aliphatic radical, an aromatic radical or the radical

$R^2$ denotes a hydrogen atom, the radical

where the individual radicals $R^6$ may be identical or different and each may denote a hydrogen atom, an aliphatic, cycloaliphatic, araliphatic or aromatic radical or, together with the adjacent nitrogen atom, may be members of a heterocyclic ring, an alkoxy group, a phenoxy group, an alkylthio group or a phenylthio group, $R^3$ denotes a hydrogen atom, $R^4$ denotes an alkyl group, $R^5$ denotes an aliphatic, cycloaliphatic, araliphatic or aromatic radical and Y denotes a halogen atom, the radical —$OSO_2R^7$ where $R^7$ denotes an aromatic radical or the radical

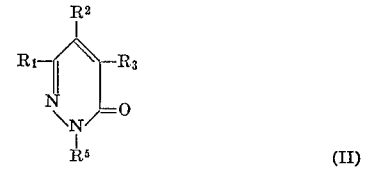

where $R^4$ has the above meaning, are advantageously obtained by reacting a pyridazone-(6) having the general formula:

(II)

where $R^1$, $R^2$, $R^3$ and $R^5$ have the meanings given above with an alkylating agent having the general formula:

$$R^4—Y \quad \text{(III)}$$

where $R^4$ and Y have the meanings given above.

When 1-phenyl-4-aminopyridazone-(6) and dimethyl sulfate are used, the reaction may be represented by the following equation:

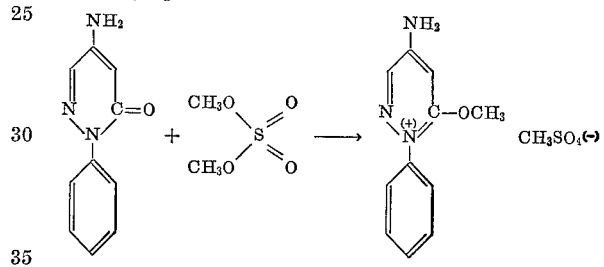

Having regard to the state of the prior art, the process according to the invention, starting from simple starting materials, gives a large number of new 6-alkoxypyridazinium compounds by a simple and economical method and in good yields and high purity.

The pyridazones-(6) having the general Formula II used as starting materials may be prepared by known methods, for example from hydrazines by the method describing in Angew. Chem. 77, 282 et seq. (1965). Preferred starting materials (II) and consequently preferred end products (I) are those in whose formulae $R^1$ denotes a hydrogen atom, a chlorine atom, a hydroxy group, an alkoxy group having one to four carbon atoms, an alkyl group having one to four carbon atoms or a phenyl radical or the radical

$R^2$ denotes a hydrogen atom, the radical

(the individual radicals $R^6$ being identical or different and each denoting a hydrogen atom, an alkyl radical having one to four carbon atoms, a cyclohexyl radical, an aralkyl radical having seven to ten carbon atoms, a phenyl radical or together with the adjacent nitrogen atom denoting members of a five-membered or six-membered heterocyclic ring which may contain an oxygen atom in addition to a nitrogen atom), an alkylthio group or an alkoxy group having in each case one to four carbon atoms, a phenylthio group or a phenoxy group, $R^3$ denotes a hydrogen atom, $R^5$ denotes an alkyl group having one to twelve carbon atoms, a cycloalkyl radical having five to eight carbon atoms, an aralkyl radical having seven to ten carbon atoms or a phenyl radical. In the preferred end products, $R^4$ denotes an alkyl group having one to three carbon atoms and Y denotes a chlorine atom, bromine atom, iodine atom, the radical —OSO$_2$R$^7$ where R$^7$ denotes a phenyl or toluyl radical, or the radical

where R$^4$ has the preferred meaning given above.

The said radicals may bear, as substituents, groups and/or atoms which are inert under the reaction conditions, for example chlorine atoms, bromine atoms, iodine atoms, fluorine atoms, alkoxy groups, alkyl groups each having one to four carbon atoms, or nitro groups.

For example the following pyridazones-(6) may be used as starting materials (II):

1-phenyl-4-aminopyridazone-(6),
1-phenylpyridazone-(6),
1-methyl-3-phenyl-4-hydrazinopyridazone-(6),
1-cyclohexyl-4-aminopyridazone-(6),
1-isopropyl-4-aminopyridazone-(6),
1-phenyl-4-benzylaminopyridazone-(6),
1-methyl-4-anilinopyridazone-(6),
1-methyl-4-ethylthiopyridazone-(6),
1-ethyl-4-phenylthiopyridazone-(6),
1-propyl-3-methylpyridazone-(6),
1-methyl-3-methyl-4-dimethylhydrazinopyridazone-(6),
1-phenyl-3-ethylpyridazone-(6), and
1-(m-trifluoromethylphenyl)-4-aminopyridazone-(6).

Preferred alkylating agents having the general Formula III are those in whose formula R$^4$ denotes an alkyl radical having one to three carbon atoms and Y denotes a chlorine, iodine or bromine atom, the radical —OSO$_2$—R$^7$ where R$^7$ denotes a phenyl or tolyl radical which may bear, as a substituent, one of the said atoms and/or groups which are inert under the reaction conditions, or the radical

where R$^4$ has the above meaning. Starting materials (III) are used in stoichiometric amounts with reference to starting materials (II) or in excess, for example in an excess of up to thirty times. For example the following starting materials (II) may be used: methyl iodide, ethyl iodide, propyl iodide, methyl chloride, ethyl chloride, propyl chloride, methyl bromide, ethyl bromide, propyl bromide, dimethyl sulfate, dipropyl sulfate or diethyl sulfate; and methyl, ethyl or propyl ester of benzenesulfonic acid, toluenesulfonic acid, 2,5-dimethylbenzenesulfonic acid, 4-chlorobenzenesulfonic acid or 4-methoxybenzenesulfonic acid.

The reaction is generally carried out at a temperature of from 0° to 200° C., preferably from 60° to 160° C., at atmospheric or superatmospheric pressure, continuously or batchwise. It is advantageous to use in the reaction an organic solvent which is inert under the reaction conditions, for example a hydrocarbon such as ligroin or cyclohexane; an aromatic hydrocarbon such as benzene, xylene, nitrobenzene or chlorobenzene; chlorohydrocarbons such as carbon tetrachloride; ethers such as dioxane, tetrahydrofuran or diethyl ether; ketones such as acetone or cyclohexanone; nitriles such as acetonitrile; esters such as ethylacetate or butyl acetate; or mixture of the same.

The reaction may be carried out as follows: the alkylating agent is added during ten minutes while mixing well to the pyridazone-(6), if desired in solution or suspension in an inert solvent. The reaction mixture is then held for one to six hours at the reaction temperature. The end product is separated from the mixture by a conventional method, for example by filtration, if necessary after removal of the solvent, or by extraction with water and evaporation of the aqueous solution formed. The end product (I) is often obtained as a syrup and is then conveniently brought into the perchlorate which is easily crystallizable and separable. Other salts, for example tetrafluoborates, may be obtained in a similar manner.

The new compounds which can be prepared according to the invention are pharmaceuticals and valuable starting materials for the production of dyes, pharmaceuticals and pesticides. Thus for example the end product specified in Example 3 has an antidepressive action and according to the method described in I. Med. Chem., 10, 427 (1967) has an ED$_{50}$ of 0.5 mg./kg.

The following examples illustrate the invention. The parts specified in the examples are parts by weight.

EXAMPLE 1

12.5 parts of 1-methyl-4-aminopyridazone-(6) and 24 parts of dimethyl sulfate in 200 parts of xylene are kept for three hours at 110° to 120° C. while mixing well. The xylene-insoluble oil which is formed is separated, dissolved in 100 parts of water and then 15 parts of 70% by weight perchloric acid is added. 20 parts of 1-methyl-4-amino-6-methoxypyridazinium perchlorate (83.5% of the theory) is obtained having a melting point of 169° to 173° C. after recrystallization from water.

EXAMPLE 2

15 parts of 1-phenyl-4-dimethylaminopyridazone-(6) is reacted analogously to Example 1. After the oil has been dissolved in 100 parts of water, 8 parts of unreacted starting material (insoluble in water) is obtained and after 7 parts of 70% perchloric acid has been added, 7.5 parts (59.4% of the theory) of 1-phenyl-4-dimethylamino-6-methoxypyridazinium perchlorate is obtained which has a melting point of 138° to 140° C. after recrystallization from methanol.

EXAMPLE 3

18.7 parts of 1-phenyl-4-aminopyridazone-(6) and 19 parts of dimethyl sulfate in 400 parts of xylene are kept at 120° C. for one hour while mixing well. The reaction mixture is suction filtered. 28 parts (89.5% of the theory) of 1 - phenyl-4-amino-6-methoxypyridazinium methosulfate is obtained having a melting point of 173° to 174° C. after recrystallization from acetonitrile. The perchlorate has a melting point of 179° to 182° C.

EXAMPLE 4

25 parts of 1-cyclohexyl-4-amino-6-methoxypyridazinium perchlorate (81.2% of the theory) having a melting point of 147° to 149° C. after recrystallization from a mixture (1:1) of acetonitrile and ethyl acetate is obtained from 21.3 parts of 1-cyclohexyl-4-aminopyridazone-(6) analogously to Example 1.

EXAMPLE 5

22 parts (73.9% of the theory) of 1-phenyl-6-methoxypyridazinium methosulfate having a melting point of 122° to 124° C. after recrystallization from acetonitrile is obtained from 17.2 parts of 1 - phenylpyridazone-(6) analogously to Example 3. The perchlorate melts at 185° to 186° C.

EXAMPLE 6

15 parts of 1-(m-trifluoromethylphenyl)-4-aminopyridazone-(6) is kept at 130° C. for three hours with 12 parts of dimethyl sulfate in 200 parts of xylene while mixing well. The xylene-insoluble oil which is formed is separated, dissolved in 100 parts of water and then 10 parts of 70% by weight perchloric acid is added. 16.5 parts (78.3% of the theory) of 1-(m-trifluoromethylphenyl)-4-amino - 6 - methoxypyridazinium perchlorate is obtained which has a melting point of 217° to 219° C. after recrystallization from water.

EXAMPLE 7

4 parts of 1-methyl-4-anilinopyridazone-(6) is kept at 130° C. for two hours with 5 parts of dimethyl sulfate in 100 parts of xylene while mixing well. The oil (insoluble in xylene) which is formed crystallizes when allowed to stand in the air. 5.3 parts (80.5% of the theory) of 1-methyl-4-anilino-6-methoxypyridazinium methosulfate is obtained which has a melting point of 162° to 164° C. after having been recrystallized from alcohol. The perchlorate melts at 134° to 136° C.

EXAMPLE 8

14.5 parts of 1-isopropyl-4-aminopyridazone-(6) is kept at 100° C. for two hours with 20 parts of dimethyl sulfate in 300 parts of dioxane while mixing well. The solvent is evaporated in vacuo and the oil which remains is dissolved in 150 parts of water. 15 parts of 70% by weight perchloric acid is added. 22 parts (86.9% of the theory) of 1-isopropyl-4-amino-6-methoxypyridazinium perchlorate is obtained which has a melting point of 112° to 115° C. after having been recrystallized from water.

EXAMPLE 9

18.7 parts of 1-phenyl-4-aminopyridazone-(6) is kept for one hour at 110° C. with 30 parts of methyl p-toluenesulfonate in 300 parts of toluene while mixing well. After the mixture has been cooled and suction filtered, 35 parts (93.8% of the theory) of 1-phenyl-4-aminomethoxypyridazinium tosylate is obtained as filter cake. It has a melting point of 169° to 171° C. after recrystallization from water.

EXAMPLE 10

13.5 parts of 1-phenyl-4-cyclohexylaminopyridazone-(6) is kept for two hours at 130° C. with 10 parts of dimethyl sulfate in 300 parts of xylene. The oil (insoluble in xylene) which is formed is separated, dissolved in 100 parts of water and then 12 parts of 70% by weight perchloric acid is added. 12.8 parts (66.7% of the theory) of 1-phenyl-4-cyclohexylamino-6-methoxypyridazinium perchlorate is obtained which has a melting point of 206° to 207° C. after recrystallization from alcohol.

EXAMPLE 11

9 parts of 1-methyl-3-(m-aminophenyl)-pyridazone-(6) is kept for one hour at 130° C. with 10 parts of dimethyl sulfate in 200 parts of xylene while mixing well. The oil (insoluble in xylene) which is formed is separated, dissolved in 30 parts of water and then 10 parts of 70% by weight perchloric acid is added. 10.5 parts (74.3% of the theory) of 1-methyl-3-(m-aminophenyl)-6-methoxypyridazinium perchlorate is obtained which has a melting point of 212° to 214° C.

EXAMPLE 12

7 parts of 1-phenyl-3-hydroxy-4-methylaminopyridazone-(6) is kept at 130° to 135° C. for one hour with 6 parts of dimethyl sulfate in 200 parts of xylene while mixing well. The oil (insoluble in xylene) which is formed crystallizes on cooling. 8.6 parts (78% of the theory) of 1-phenyl-3-hydroxy-4-methylamino-6-methoxypyridazinium methosulfate is obtained which has a melting point of 165° to 168° C. The perchlorate melts at 180° to 185° C. after recrystallization from alcohol.

EXAMPLE 13

10 parts of 1-phenyl-3,4-di(methylamino)-pyridazone-(6) is kept for two hours at 130° to 135° C. with 12 parts of dimethyl sulfate in 150 parts of xylene while mixing well. The oil (insoluble in xylene) which is formed is separated, dissolved in water and then 10 parts of 70% by weight perchloric acid is added. 9 parts (60% of the theory) of 1-phenyl-3,4-di-(methylamino)-6-methoxypyridazinium perchlorate is obtained which has a melting point of 140° to 142° C. after having been recrystallized from a mixture (1:1) of water and alcohol.

EXAMPLE 14

26 parts of 1-phenyl-4-morpholinopyridazone-(6) is kept for one hour at 135° to 140° C. with 24 parts of dimethyl sulfate in 200 parts of xylene while mixing well. The oil (insoluble in xylene) which is formed has 50 parts of acetonitrile added to it. 12 parts of 1-phenyl-4-morpholino-6-methoxypyridazinium methosulfate (31.3% of the theory) crystallizes out. It has a melting point of 186° to 187° C. after having been recrystallized from acetonitrile. 100 parts of water and 15 parts of a 70% by weight perchloric acid are added to the combined acetonitrile filtrates. 21 parts (56.6% of the theory) of 1-phenyl-4-morpholino-6-methoxypyridazinium perchlorate is obtained which has a melting point of 215° to 217° C. after having been recrystallized from water.

EXAMPLE 15

24 parts of 1-phenyl-4-pyrrolidinopyridazone-(6) is kept for one hour at 135° to 140° C. with 24 parts of dimethyl sulfate in 200 parts of xylene while mixing well. The oil (insoluble in xylene) which is formed is treated with 50 parts of water. 10 parts of starting material (II) is thus precipitated. 10 parts of 70% by weight perchloric acid is added to the filtrate. 14 parts (67.7% of the theory) of 1-phenyl-4-pyrrolidinopyridazinium perchlorate crystallizes out. It has a melting point of 189° to 191° C. after having been recrystallized from water.

We claim:
1. A process for the production of 6-alkoxypyridazinium compounds having the formula:

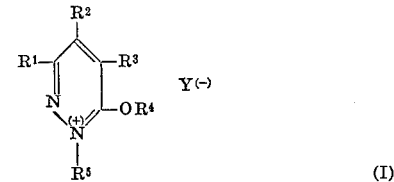

where:
R$^1$ denotes hydrogen, chlorine, hydroxy, alkoxy of 1 to 4 carbon atoms, alkyl of 1 to 4 carbon atoms, phenyl, or the radical

R$^2$ denotes hydrogen or the radical

the individual radicals R$^6$ being identical or different and each denoting hydrogen, alkyl of 1 to 4 carbon atoms, cyclohexyl, aralkyl of 7 to 10 carbon atoms, phenyl, or together with the adjacent nitrogen atom being members of a five or six membered nitrogen or nitrogen and oxygen containing heterocyclic riing, alkoxy of 1 to 4 carbon atoms or alkylthio of 1 to 4 carbon atoms, R$^3$ denotes hydrogen, R$^4$ denotes alkyl of 1 to 3 carbon atoms, R denotes alkyl of 1 to 12 carbon atoms, cycloalkyl of 5 to 8 carbon atoms, aralkyl of 7 to 10 carbon atoms or phenyl and Y denotes chlorine, bromine or iodine, the radical OSO$_2$R$^7$ where R$^7$ denotes phenyl or toluyl or the radical

(where R$^4$ has the above meaning) wherein a pyridazone-(6) having the formula:

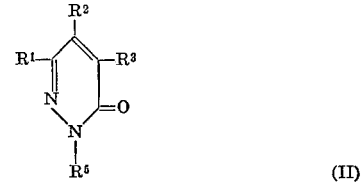

where $R^1$, $R^2$, $R^3$ and $R^5$ have the above meanings is reacted with an alkylating agent having the formula:

$$R^4\text{—}Y \quad (III)$$

where $R^4$ and Y have the meanings given above.

2. A 6-alkoxypyridazinium compound having the formula:

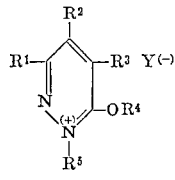

(I)

where:
$R^1$ denotes hydrogen, chlorine, hydroxy, alkoxy of one to four carbon atoms, alkyl of 1 to 4 carbon atoms or phenyl or the radical

$R^2$ denotes hydrogen or the radical

(where the individual radicals $R^6$ may be identical or different and each denotes hydrogen, alkyl of one to four carbon atoms, cyclohexyl, aralkyl of seven to ten carbon atoms, phenyl or together with the adjacent nitrogen atom may be a member of a five-membered or six-membered heterocyclic ring which may contain an oxygen atom in addition to the nitrogen atom), or an alkylthio or alkoxy having one to four carbon atoms, $R^3$ denotes hydrogen,
$R^4$ denotes alkyl of one to three carbon atoms,
$R^5$ denotes alkyl of one to twelve carbon atoms, cycloalkyl of five to eight carbon atoms, aralkyl of seven to ten carbon atoms or phenyl, and Y denotes chlorine, bromine, iodine, the radical —$OSO_2R^7$ (where $R^7$ denotes phenyl or toluyl) or the radical

(where $R^4$ has the meaning given above), and
$R^1$ does not denote methyl and does not denote phenyl when $R^4$ and
$R^5$ both denote methyl and $R^2$ denotes hydrogen.

3. A process as in claim 1 carried out at a temperature of from 0° to 200° C.

4. A process as in claim 1 carried out at a temperature of from 60° to 160° C.

5. A process as in claim 1 carried out in the presence of an organic solvent which is inert under the reaction conditions.

References Cited

UNITED STATES PATENTS 2,891,953   6/1959   Clark _____ 260—250 A

NICHOLAS S. RIZZO, Primary Examiner

U.S. Cl. X.R.

260—250 R; 424—250